(12) United States Patent
Lee

(10) Patent No.: US 11,853,206 B2
(45) Date of Patent: Dec. 26, 2023

(54) MEMORY SYSTEM AND OPERATION METHOD THEREOF

(71) Applicant: SK hynix Inc., Gyeonggi-do (KR)

(72) Inventor: Jong-Hwan Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 972 days.

(21) Appl. No.: 16/657,599

(22) Filed: Oct. 18, 2019

(65) Prior Publication Data
US 2020/0226063 A1  Jul. 16, 2020

(30) Foreign Application Priority Data
Jan. 15, 2019 (KR) .................. 10-2019-0004957

(51) Int. Cl.
| | |
|---|---|
| *G06F 12/06* | (2006.01) |
| *G06F 12/02* | (2006.01) |
| *G06F 9/50* | (2006.01) |
| *G06F 13/16* | (2006.01) |
| *G06F 12/0882* | (2016.01) |

(52) U.S. Cl.
CPC ........ *G06F 12/0269* (2013.01); *G06F 9/5022* (2013.01); *G06F 12/0246* (2013.01); *G06F 12/0882* (2013.01); *G06F 13/1668* (2013.01)

(58) Field of Classification Search
CPC ............ G06F 12/0269; G06F 12/0246; G06F 12/0882; G06F 12/00; G06F 13/1668; G06F 13/00
See application file for complete search history.

(56) References Cited

U.S. PATENT DOCUMENTS

| | | | |
|---|---|---|---|
| 2011/0040976 A1* | 2/2011 | Yairi ..................... | G06F 1/14 713/178 |
| 2016/0070593 A1* | 3/2016 | Harris .................... | G06F 9/522 718/106 |
| 2016/0299689 A1* | 10/2016 | Kim ...................... | G06F 3/0688 |
| 2017/0300410 A1* | 10/2017 | Zhang ................. | G06F 12/0246 |
| 2019/0042406 A1* | 2/2019 | Guniguntala ....... | G06F 12/0253 |
| 2019/0227926 A1* | 7/2019 | Ke ....................... | G06F 12/0246 |

FOREIGN PATENT DOCUMENTS

| | | |
|---|---|---|
| KR | 10-2016-0120381 | 10/2016 |
| KR | 10-2016-0124990 | 10/2016 |

* cited by examiner

*Primary Examiner* — Tuan V Thai
(74) *Attorney, Agent, or Firm* — IP & T GROUP LLP

(57) ABSTRACT

An operation method of a memory system, the operation method may include: determining a garbage collection trigger condition based on current time and usage of the memory system over a set period of time; and performing a garbage collection operation when the garbage collection trigger condition is satisfied.

14 Claims, 13 Drawing Sheets

FIG. 2A

| Block1 | Block2 | Block3 | Block4 | Block5 |
|--------|--------|--------|--------|--------|
| Valid | Invalid | Invalid | Valid | Erase |
| Valid | Invalid | Invalid | Invalid | Erase |
| Valid | Invalid | Invalid | Invalid | Erase |
| Valid | Valid | Invalid | Invalid | Erase |
| Valid | Invalid | Invalid | Invalid | Erase |
| Valid | Invalid | Valid | Invalid | Erase |
| Invalid | Invalid | Invalid | Invalid | Erase |
| Valid | Invalid | Valid | Invalid | Erase |
| Valid | Invalid | Invalid | Invalid | Erase |
| Valid | Invalid | Invalid | Invalid | Erase |

FIG. 2B

| Block1 | Block2 | Block3 | Block4 | Block5 |
|--------|--------|--------|--------|--------|
| Valid | Erase | Erase | Erase | Valid |
| Valid | Erase | Erase | Erase | Valid |
| Valid | Erase | Erase | Erase | Valid |
| Valid | Erase | Erase | Erase | Valid |
| Valid | Erase | Erase | Erase | Erase |
| Valid | Erase | Erase | Erase | Erase |
| Valid | Erase | Erase | Erase | Erase |
| Valid | Erase | Erase | Erase | Erase |
| Valid | Erase | Erase | Erase | Erase |
| Invalid | Erase | Erase | Erase | Erase |

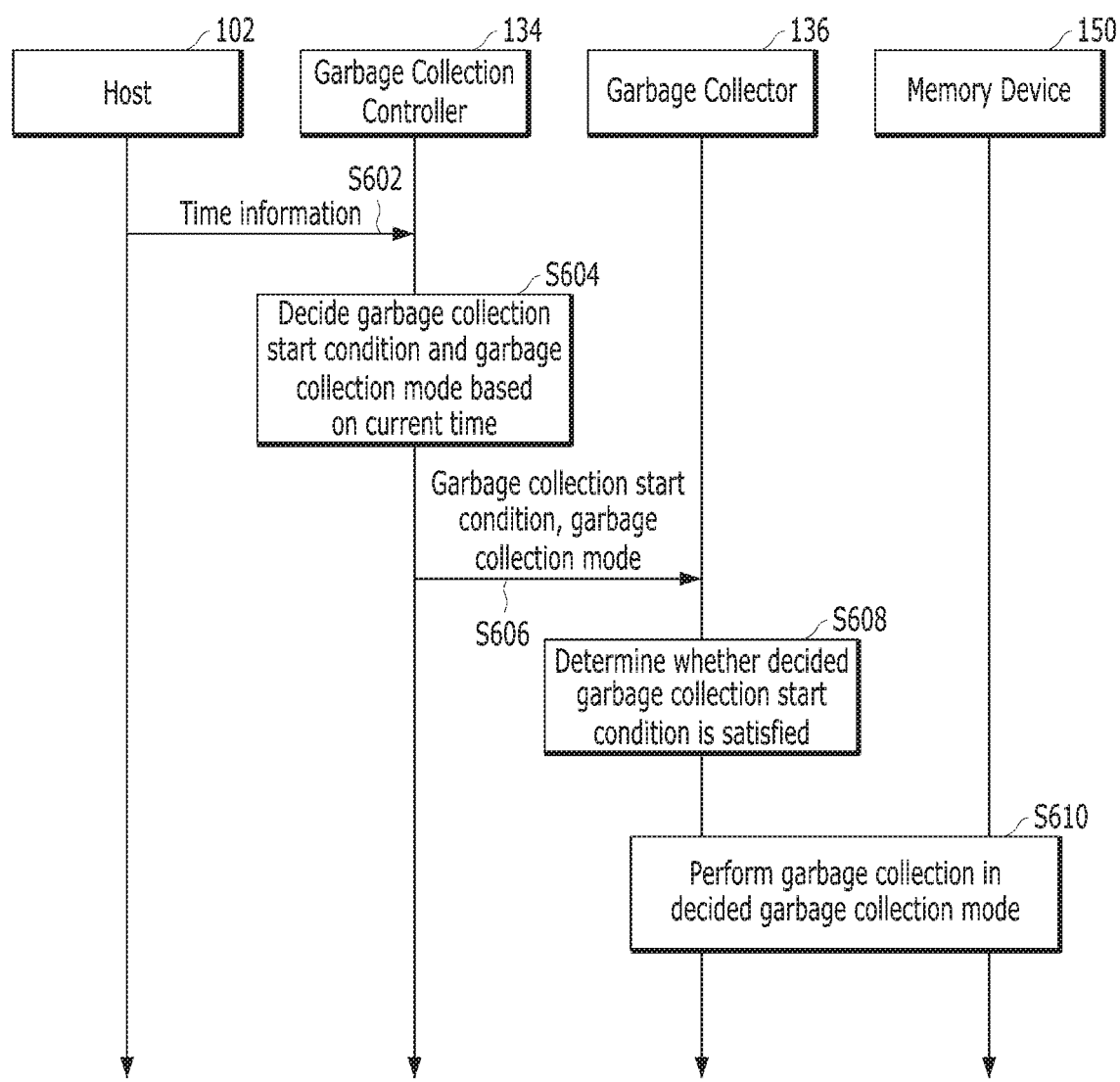

MEMORY SYSTEM AND OPERATION METHOD THEREOF

CROSS-REFERENCE TO RELATED APPLICATION

This application claims priority under 35 U.S.C. § 119 to Korean Patent Application No. 10-2019-0004957, filed on Jan. 15, 2019, which is incorporated herein by reference in its entirety.

BACKGROUND

1. Field

Various embodiments relate to a memory system.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to a memory system capable of improving the performance of a foreground operation, and an operation method thereof.

In an embodiment, an operation method of a memory system, the operation method may include: determining a garbage collection trigger condition based on current time and usage of the memory system over a set period of time; and performing a garbage collection operation when the garbage collection trigger condition is satisfied.

In an embodiment, a memory system may include: a memory device configured to store data; and a controller configured to control the memory device. The controller may include: a garbage collection controller configured to determine a garbage collection trigger condition based on current time and usage of the memory system over a set period of time; and a garbage collector configured to perform a garbage collection operation when the garbage collection trigger condition is satisfied.

In an embodiment, an operating method of a controller, the operating method may include: identifying current time falling in one of first and second time-windows based on time information provided from a host; and controlling the memory device to perform a background operation upon satisfying first and second trigger conditions during the first and second time-windows, respectively, wherein the memory device is controlled such that the memory device alternately performs the background operation and a requested foreground operation according to first and second alternation periods during the first and second time-windows, respectively.

BRIEF DESCRIPTION OF THE DRAWINGS

FIGS. 2A and 2B are diagrams illustrating a memory device including a plurality of memory blocks.

FIG. 6 is a flowchart illustrating an operation of a memory system in accordance with an embodiment of the present invention.

DETAILED DESCRIPTION

Various embodiments of the present invention are described below with reference to the accompanying drawings. It should be understood that the following description focuses on features and aspects of embodiments of the present invention; description of well-known technical information is omitted so as not to unnecessarily obscure such features and aspects.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Throughout the specification, reference to "an embodiment," "another embodiment" or the like is not necessarily to only one embodiment, and different references to any such phrase are not necessarily to the same embodiment(s).

Figure 1:
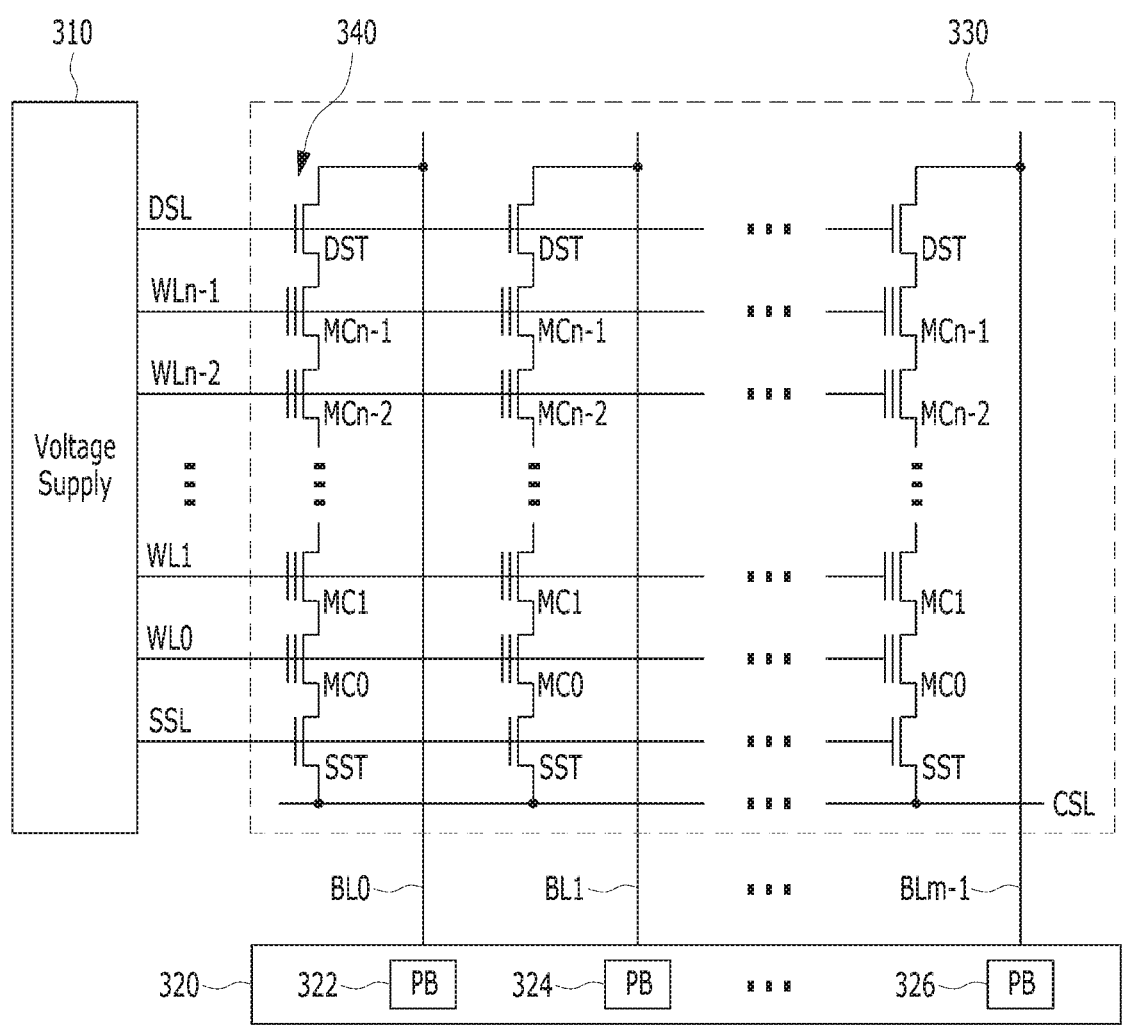
FIG. 1 is a diagram illustrating a memory cell array included in a memory device which is controlled by a controller.

FIG. 1 is a circuit diagram illustrating a configuration of a memory cell array included in a memory device 150.

Referring to FIG. 1, a memory block 330, which may correspond to any of the plurality of memory blocks included in the memory device 150 of a memory system 110 (shown in FIG. 3), may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cells MC0 to MCn−1 may be embodied by an MLC capable of storing a plurality of bits of data. Each of the cell strings 340 may be electrically coupled to a corresponding bit line among the plurality of bit lines BL0 to BLm−1. For example, as illustrated in FIG. 1, the first cell string is coupled to the first bit line BL0, and the last cell string is coupled to the last bit line BLm−1. For reference, in FIG. 1, 'DSL' denotes a drain select line, 'SSL' denotes a source select line, and 'CSL' denotes a common source line.

Although FIG. 1 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Each of the plurality of memory blocks included in the memory device 150 may be a single level cell (SLC) memory block or a multi-level cell (MLC) memory block, depending on the number of bits of data each of the memory cells therein is capable of storing. Each SLC of an SLC memory block stores one bit of data, whereas each MLC of an MLC memory block stores multiple bits of data. An MLC memory block in which each memory cell stores three bits of data may be referred to as a triple level cell (TLC) memory block, and an MLC memory block in which each memory cell stores four bits of data may be referred to as a quadruple level cell (QLC) memory block. An MC memory block also includes a memory block realized by memory cells capable of storing five or more bits of data in one memory cell.

The memory device 150 may be embodied by a two-dimensional (2D) or three-dimensional (3D) memory device. Particularly, the memory device 150 may be embodied by a nonvolatile memory device having a 3D stack structure. When the memory device 150 has a 3D structure, the memory device 150 may include a plurality of 3D memory blocks.

In accordance with an embodiment of the present invention, the memory device 150 is a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM). The memory device 150, however, is not limited to the non-volatile memory type.

FIGS. 2A and 2B illustrate a memory device 150 including a plurality of memory blocks, for example, memory blocks Block 1 to Block 5.

By way of example, FIGS. 2A and 2B illustrate that the memory device 150 includes five memory blocks. Each of the memory blocks may in FIGS. 2A and 2B may be configured the same or similarly to the memory block 330 described with reference to FIG. 1. Although FIGS. 2A and 2B show five memory blocks as an example, the number of memory blocks may vary depending on design.

Each of the memory blocks may include memory cells coupled to a plurality of word lines. When memory cells coupled to one word line are referred to as a page, each of the memory blocks may include a plurality of pages. Each of the memory blocks illustrated in FIGS. 2A and 2B may include ten pages.

The voltage supply 310 of FIG. 1 may apply a voltage to a word line to perform a write operation. That is, the minimum unit of the write operation of the memory device 150 may correspond to memory cells coupled to one word line, i.e. one page.

The voltage supply 310 may apply voltages to all of the word lines included in the memory block 330 to perform an erase operation, thereby removing charges trapped in those memory cells. That is, the minimum unit of the erase operation of the memory device 150 may correspond to one memory block.

That is, the write operation and the erase operation of the memory device 150 may be performed on different bases, and the memory device 150 may not support an overwrite operation. Therefore, in order to update data stored in a certain page, a controller 130 (see FIG. 3) may control the memory device 150 to write the data to be updated to another page, and invalidate the existing page.

In FIGS. 2A and 2B, a valid page is represented by "Valid", an invalid page is represented by "Invalid", and an erase page is represented by "Erase".

FIG. 2A illustrates the case in which only a fifth block (Block5) is a free block, and the other memory blocks are dirty blocks. The free block may indicate a memory block of which all pages are erase pages or invalid pages, i.e. a memory block which will be erased soon. The dirty block may indicate a memory block which is not a free block.

Referring to FIG. 2A, when the number of invalidated pages in the memory device 150 increases, the memory device 150 may lack adequate memory space to store data.

In order to remove invalidated pages of a memory block, the controller 130 may control the memory device 150 to write valid pages of a victim block to a target block and to perform an erase operation on the victim block. Such series of operations may be referred to as a garbage collection (GC) operation. Such controller 130 is described with reference to FIG. 3.

FIG. 2B illustrates that a garbage collection operation has been performed in the memory device 150 of FIG. 2A. When valid data of second to fourth blocks (Block2 to Block4) are collected and transferred to the fifth block (Block5), three free blocks may be generated. That is, Block2, Block3 and Block4 have become free blocks. Referring to FIG. 2B, the memory device 150 may perform a garbage collection operation to secure memory space capable of storing data.

Figure 3:
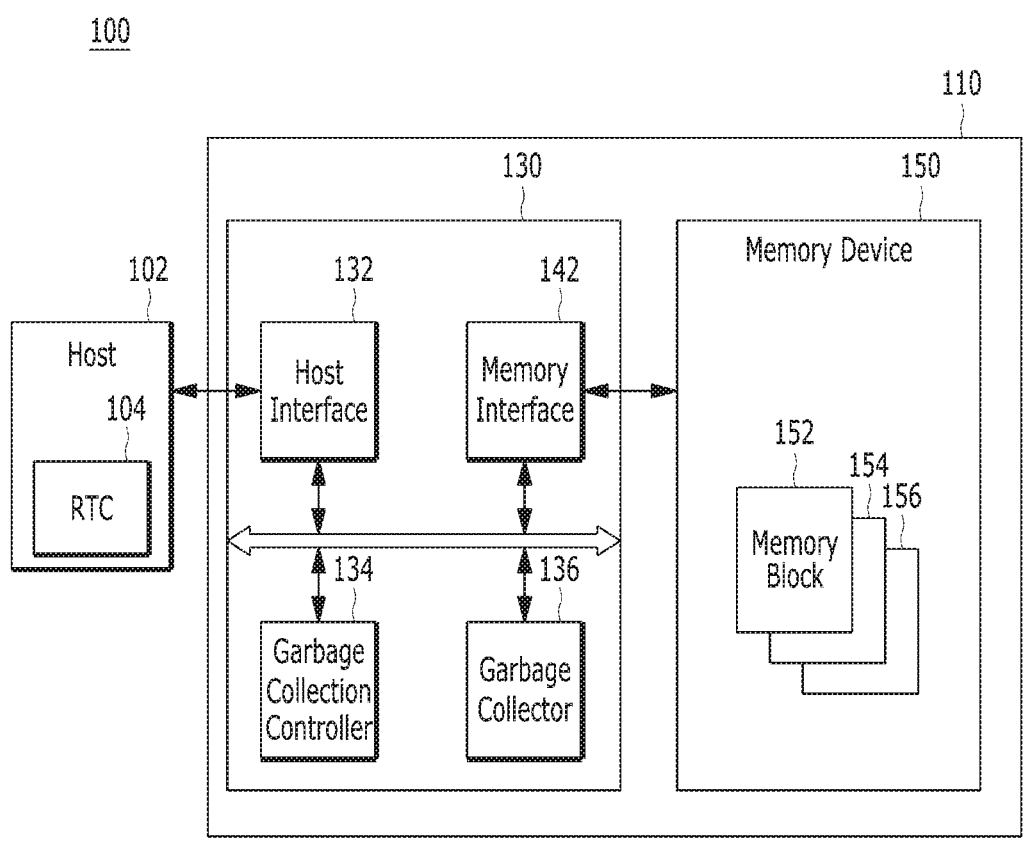
FIG. 3 is a diagram schematically illustrating a structure of a data processing system including a memory system in accordance with an embodiment of the present invention.

FIG. 3 schematically illustrates a structure of a data processing system 100 including a memory system 110 in accordance with an embodiment.

The data processing system 100 may include a host 102 and the memory system 110. The memory system 110 may include the memory device 150 described with reference to FIG. 1 and a controller 130 for controlling the memory device 150.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 include any of a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include the memory device 150 and the controller 130.

In an embodiment, the controller 130 and the memory device 150 may be integrated into a single semiconductor device to constitute a solid state drive (SSD). When the memory system 110 is used as an SSD, the operating speed of the host 102 connected to the memory system 110 can be improved. In another embodiment, the controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152, 154, 156 . . . , each of which may include a plurality of pages, and each of the pages may include a plurality of memory cells coupled to a word line.

In an embodiment, the memory device 150 may be a flash memory. The flash memory may have a 3-dimensional (3D) stack structure.

The controller 130 in the memory system 110 may control the memory device 150 in response to a request from the host 102. For example, the controller 130 may provide data read from the memory device 150 to the host 102, and store data provided from the host 102 in the memory device 150. For this operation, the controller 130 may control read, write, program and erase operations of the memory device 150.

The controller 130 may be implemented with a processor, a memory and an input/output port.

The processor may control overall operations of the memory system 110. In particular, the processor may control a program operation or read operation on the memory device 150 in response to a write request or read request from the host 102.

For example, the controller 130 may perform an operation requested by the host 102 through a processor, which may be realized as a microprocessor or a CPU. In other words, the controller 130 may perform a command operation corresponding to a command received from the host 102. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

The controller 130 may perform a background operation on the memory device 150 through the processor.

The memory (of the controller 130) may serve as a working memory of the memory system 110 and the controller 130, and store data for driving the memory system 110 and the controller 130. More specifically, when the controller 130 controls the memory device 150 in response to a request from the host 102, for example, when the controller 130 controls read, write, program and erase operations of the memory device 150 in order to provide data read from the memory device 150 to the host 102 and to store data provided from the host 102 in the memory device 150, the memory may store data required for performing such operations on the memory system 110, i.e., between the controller 130 and the memory device 150.

The memory may be embodied by a volatile memory. For example, the memory may be embodied by static random access memory (SRAM) or dynamic random access memory (DRAM). The memory may be disposed within or out of the controller 130. FIG. 1 exemplifies the memory disposed within the controller 130. In an embodiment, the memory may be embodied by an external volatile memory having a memory interface transferring data between the memory and the controller 130.

As described above, the memory may store data required for performing a data write/read operation between the host and the memory device 150 and data when the data write/read operation is performed. In order to store such data, the memory may include a program memory, data memory, write buffer/cache, read buffer/cache, data buffer/cache, map buffer/cache or the like.

The controller 130 may include a host interface 132, a garbage collection controller 134, a garbage collector 136, and a memory interface 142 such as a NAND flash controller (NFC).

The host interface 132 may be configured to process a command and data of the host 102, and may communicate with the host 102 through one or more of various interface protocols, such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host interface 132 may be driven through firmware referred to as a host interface layer (HIL) in order to exchange data with the host.

The memory interface 142 may serve as a memory/storage interface for interfacing the controller 130 and the memory device 150 such that the controller 130 controls the memory device 150 in response to a request from the host 102. When the memory device 150 is a flash memory, or specifically a NAND flash memory, the memory interface 142 may generate a control signal for the memory device 150 and process data to be provided to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150.

The memory interface 142 may be driven through firmware referred to as a flash interface layer (FIL) in order to exchange data with the memory device 150.

In an implementation, the memory interface 142 may include an ECC component. The ECC component may correct an error bit of data processed by the memory device 150, and include an ECC encoder and an ECC decoder. The ECC encoder can error-correct-encode data to be programmed in the memory device 150 to generate data with a parity bit added thereto. The data to which the parity bit is added may be stored in the memory device 150. The ECC decoder can detect and correct errors contained in the data read from the memory device 150.

The ECC component may detect and correct an error contained in the data read from the memory device 150. In other words, the ECC component may perform an error correction decoding process to the data read from the memory device 150 through an ECC value used during an ECC encoding process. According to a result of the error correction decoding process, the ECC unit may output a signal, for example, an error correction success/fail signal. When the number of error bits is more than a threshold value of correctable error bits, the ECC component may not correct the error bits, and may instead output an error correction fail signal.

The ECC component may perform error correction through a coded modulation, such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) or Block coded modulation (BCM). However, the ECC component is not limited to any specific code or structure. The ECC component may include any and all circuits, modules, systems or devices for error correction.

The garbage collector 136 may perform the garbage collection operation described with reference to FIGS. 2A and 2B. For example, the garbage collector 136 may detect the number of free blocks in the memory device 150, and perform a garbage collection operation based on the detected number of free blocks. The garbage collector 136 may select a victim block based on the number of valid pages in each memory block, for example. The garbage collector 136 may control the memory device 150 to read valid pages of the selected victim block. The garbage collector 136 may control the memory device 150 to write the data of the valid pages, read from the memory device 150, to a target block.

The garbage collection operation is a background operation performed to reclaim memory space of the memory device 150. However, while the garbage collection operation is being performed, the performance of a foreground operation of the memory system may be degraded. Specifically, the memory device 150 cannot perform a read or write operation according to a request of the host while performing the garbage collection operation under control of the garbage collector 136. Thus, the throughput of the foreground operation may be reduced.

The memory device 150 may not perform foreground operations all hours of the day. For example, since users rarely use the host 102 in the nighttime, foreground operations of the memory system 110 may be only rarely performed during that time. Furthermore, although a request is received from the host 102 in the nighttime, the memory system 110 may not provide a fast response to the corresponding request in the case that the request is not made by a user but by the host 102 itself.

On the other hand, users may frequently use the host 102 in the daytime, and frequently access the memory system 110. That is, during the daytime, foreground operations of the memory system 110 may be frequently performed.

In this specification, a time-window in which users frequently use the host 102 may be defined as an active time period, and a time-window in which users seldom use the host 102 may be defined as an inactive time period. The active time-window and the inactive time-window may be experimentally or heuristically determined and information thereon may be stored in the memory system 110. For example, the active time-window may be the daytime, and the inactive time-window may be the nighttime.

The host 102 may recognize the current time. FIG. 3 illustrates the host 102 that can recognize the current time through a real-time clock (RTC) 104. The memory system 110 may recognize the current time by receiving time information from the host 102.

In accordance with an embodiment, the memory system 110 may perform garbage collection operations more frequently when the current time is in the inactive time-window than when the current time is in the active time-window, thereby securing many free blocks in the memory device 150. In the inactive time-window, few requests may be provided from the host 102 by users. Thus, although the throughput of the foreground operation is degraded as the memory system 110 frequently performs garbage collection operations in the inactive time-window, users may not feel the degradation in performance since they seldom use the memory system 110 during that time.

Since many free blocks are secured in the inactive time-window, the memory system 110 may perform an operation using the secured free blocks in the active time-window. Therefore, the memory system 110 may provide a fast response to a request from the host 102 in the active time-window.

In accordance with an embodiment, the garbage collection controller 134 may determine the frequency of garbage collection operations based on the current time.

In accordance with an embodiment, the garbage collection controller 134 may determine a garbage collection trigger condition based on the current time together with information about when a user is most and least likely to use the memory system 110, i.e., active and inactive time windows respectively. For example, even when the memory device 150 has a larger number of free blocks in the inactive time-window than in the active time-window, the garbage collection controller 134 may determine the garbage collection trigger condition so as to perform a garbage collection operation more frequently in the inactive time-window, which may secure as many free blocks as the memory device 150 can in that time period. In that case, during the active time-window, when the user is most likely to be using the memory device 150, many free blocks have been secured to provide a better usage experience.

Figure 4:
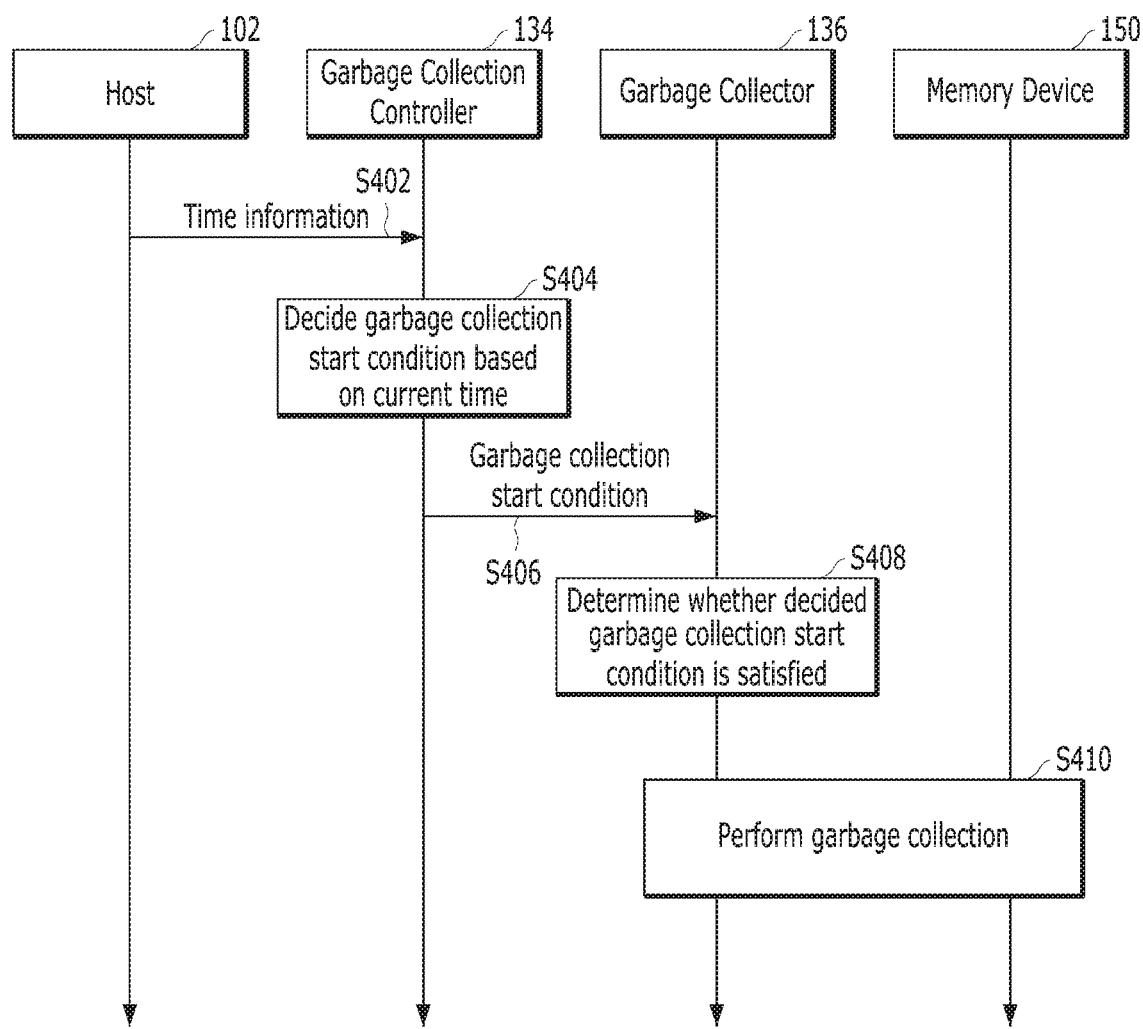
FIG. 4 is a flowchart illustrating an operation of a memory system in accordance with an embodiment of the present invention.

In accordance with an embodiment, the garbage collection controller 134 may determine a garbage collection mode based on the current time and active and inactive usage periods. For example, the garbage collection controller 134 may determine the garbage collection mode such that the garbage collection operation is performed longer in the inactive time-window than in the active time-window. FIG. 4 is a flowchart illustrating an operation of the memory system 110 in accordance with an embodiment.

In step S402, the garbage collection controller 134 may receive time information from the host 102 through the host interface 132.

In an implementation, the host 102 may provide time information to the garbage collection controller 134 in a particular period, which may be predetermined. In an implementation, when the controller 130 requests time information while providing the host 102 with a response to a request of the host 102, the host 102 may provide the time information received from the host 102 to the garbage collection controller 134. The time information may indicate the time when the host 102 provides the time information to the garbage collection controller 134. The garbage collection controller 134 may determine the current time based on the time information.

In step S404, the garbage collection controller 134 may determine a garbage collection trigger condition based on the current time along with active and inactive time windows or periods reflecting use amount or frequency.

In an embodiment, when the number of free blocks included in the memory device 150 is equal to or less than a threshold value, the garbage collector 136 may perform a garbage collection operation. The garbage collection controller 134 may determine two different threshold values depending on whether the current time is in the active time-window or in the inactive time-window. A first threshold value may be used when the current time is in the active time-window, and a second threshold value larger than the first threshold value may be used when the current time is in the inactive time-window. In an embodiment, each of the first and second threshold values represent a minimum number of free blocks in the memory system 110. That is, in the active time-window, the garbage collection controller 134 may control the garbage collector 136 to perform a garbage collection operation only when free blocks need to be additionally secured. In contrast, in the inactive time-window, the garbage collection controller 134 may control the garbage collector 136 to perform a garbage collection operation in order to secure more free blocks even though there are already a sufficient number of free blocks. Essentially, the memory system 110 is operated to stockpile free blocks during inactive time-windows to secure their use during active time-windows without the need to perform too many garbage collection operations during the active time-windows and hence not unduly interfere with foreground operations being performed during the active time-windows.

In step S406, the garbage collection controller 134 may provide the determined garbage collection trigger condition to the garbage collector 136.

In step S408, the garbage collector 136 may determine whether the received garbage collection trigger condition is satisfied.

In an embodiment, the garbage collector 136 may determine whether the number of free blocks included in the memory device 150 is equal to or less than the first or second threshold value for the active and inactive time-windows respectively.

When the determined garbage collection trigger condition is satisfied, the garbage collector 136 may perform a garbage collection operation in step S410. Specifically, the garbage collector 136 may select a victim block and a target block of the garbage collection operation, and control the memory device 150 to perform a read, write or erase operation accompanied by the garbage collection operation.

Figure 5:
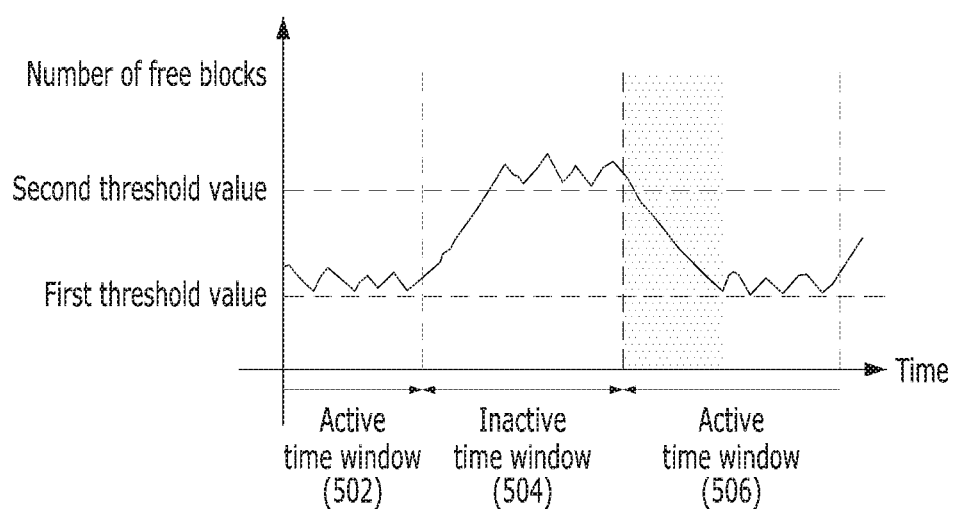
FIG. 5 is a diagram illustrating improved performance of a memory system in accordance with an embodiment of the present invention.

FIG. 5 is a diagram for illustrating improved performance of the memory system 110 in accordance with an embodiment.

In the graph of FIG. 5, the horizontal axis indicates time, and the vertical axis indicates the number of free blocks in the memory device 150. The horizontal axis of the graph shows that the current time is initially in an active time-window 502, and as time elapses, falls within an inactive time-window 504 and then back in an active time-window 506. The vertical axis of the graph shows a first threshold value as the garbage collection trigger condition of the active time-window and a second threshold value as the garbage collection trigger condition of the inactive time-window.

In the active time-window 502, the memory system 110 needs to provide a fast response to a request of the host 102. Thus, the garbage collector 136 cannot perform many garbage collection operations. The graph shows that the number of free blocks stays around the first threshold value in the active time-window 502 because much data are already stored in the memory device 150, and the graph also shows that the garbage collection operation of the memory system 110 is not continuously or frequently performed in the active time-window.

In the inactive time-window 504, the memory system 110 does not need to provide a fast response to a request of the host 102. Thus, the garbage collector 136 may perform many garbage collection operations. The graph shows that the garbage collection trigger condition is changed to the second threshold value in the inactive time-window 504, the garbage collection operation is performed even though the number of free blocks is equal to or more than the first threshold value; such garbage collection is performed until the number of free blocks reaches the second threshold value.

In the active time-window 506, data may be written to many free blocks secured in the inactive time-window 504. In particular, a shaded time period indicates the time elapsed until the number of free blocks, which has reached the second threshold value, decreases to the first threshold value while the free blocks are used. However, because the shaded time period occurs in an active-time window, until the number of free blocks reaches the first threshold value, no garbage collection operation may be performed. Therefore, the throughput of the foreground operation of the memory system 110 in the active-time window may be improved, and users may feel an improvement in performance of the memory system 110.

FIG. 6 is a flowchart illustrating an operation of the memory system 110 in accordance with an embodiment.

In step S602, the garbage collection controller 134 may receive time information from the host 102 through the host interface 132. The garbage collection controller 134 may determine the current time based on the time information.

In step S604, the garbage collection controller 134 may determine a garbage collection trigger condition and a garbage collection mode based on the current time, as well as on active and inactive time windows or periods reflecting use amount or frequency.

The garbage collection trigger condition may be the same as that described with reference to step S404 of FIG. 4.

In an embodiment, when the garbage collection trigger condition is satisfied and a request is received from the host 102, the controller 130 may perform a foreground operation and a garbage collection operation, alternating between the two, in order to provide a fast response to the request of the host 102. That is, a series of operations in which the foreground operation is performed during a second time duration after the garbage collection operation is performed during a first time duration may be repeated until one or the other of the operations is completed. In this specification, the first time duration during which the garbage collection operation lasts may be referred to as the duration time of the garbage collection operation. The garbage collection controller 134 may determine the garbage collection mode by changing the duration time of the garbage collection operation.

Figure 7A:
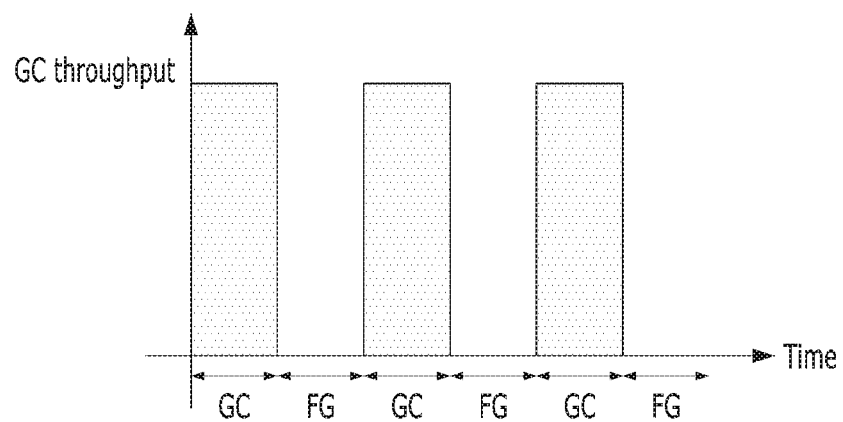
FIGS. 7A and 7B are graphs illustrating improved performance of a memory system based on a garbage collection mode in accordance with an embodiment of the present invention.
Figure 7B:
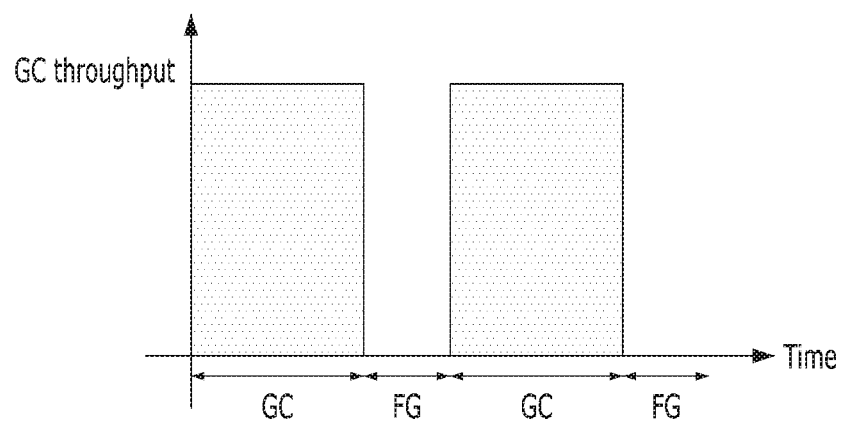

FIGS. 7A and 7B are graphs illustrating an improvement in performance of the memory system 110 based on the garbage collection mode.

In the graphs of FIGS. 7A and 7B, the horizontal axis indicates time, and the vertical axis quantitatively indicates the throughput of the garbage collection operation. The corresponding axes of FIGS. 7A and 7B are illustrated with the same scale.

The graph of FIG. 7A indicates the performance of the memory system 110 when the garbage collection mode is a first mode.

Referring to the graph of FIG. 7A, when the memory system 110 needs to perform both of the garbage collection operation and the foreground operation, the garbage collection operation GC is performed for the first time duration and the foreground operation FG is performed for the second time duration in an alternating manner. When the memory system 110 performs the garbage collection operation, the throughput of the garbage collection operation may be increased. However, when the memory system 110 performs the foreground operation, the garbage collection operation cannot be performed at the same time as the foreground operation. Thus, the throughput of the garbage collection operation may be reduced.

The graph of FIG. 7B indicates the performance of the memory system 110 when the garbage collection mode is a second mode. In the second mode, the duration time of the garbage collection operation may be longer than in the first mode.

Even when the garbage collection mode is the second mode, the garbage collection operation GC in the first time duration and the foreground operation FG in the second time duration may be alternately performed as in the first mode.

In addition to the first time duration being greater in the second mode than in the first mode, the total time of a single period in which the garbage collection operation GC and the requested foreground operation FG are each performed once in succession may be longer in the second mode than in the first mode, as illustrated in FIGS. 7A and 7B.

Shaded portions illustrated in the graphs of FIGS. 7A and 7B indicate throughputs of the garbage collection operations. Referring to FIGS. 7A and 7B, when the garbage collection mode is set to the second mode, the garbage collector 136 may perform longer garbage collection operations than when the garbage collection mode is set to the first mode.

When the received current time is in the active time-window, the garbage collection controller 134 may determine the garbage collection mode as the first mode. When the received current time is in the inactive time-window, the garbage collection controller 134 may determine the garbage collection mode as the second mode.

Referring back to FIG. 6, the garbage collection controller 134 may provide the determined garbage collection trigger condition and the determined garbage collection mode to the garbage collector 136 in step S606.

In step S608, the garbage collector 136 may determine whether the determined garbage collection trigger condition is satisfied.

When the determined garbage collection trigger condition is satisfied, the garbage collector 136 may perform a garbage collection operation in the garbage collection mode in step S610.

When the received current time is in the active time-window, the garbage collector 136 may perform a garbage collection operation in the first mode. Therefore, the memory system 110 may provide a fast response to a request of the host 102.

When the received current time is in the inactive time-window, the garbage collector 136 may perform a garbage collection operation in the second mode. Therefore, the memory system 110 may intensively perform the garbage collection operation.

In accordance with an embodiment described with reference to FIGS. 1 to 7B, the memory system 110 may promote the garbage collection operation by appropriately determining the garbage collection trigger condition and the garbage collection mode when the current time is in the inactive time-window to secure a large number of free blocks in the memory device 150. In contrast, when the current time is in the active time-window, the memory system 110 may promote more efficient performance of a write operation by using the many free blocks secured during the inactive time-window to provide a fast response to a request of the host 102.

In accordance with an embodiment, the garbage collection controller 134 may set an additional operation condition as well as the garbage collection trigger condition and the garbage collection mode, in order to promote the garbage collection operation in the inactive time-window. The garbage collection controller 134 may provide the additional operation condition to the garbage collector 136.

For example, the garbage collection controller 134 may change the condition for selecting a victim block of the garbage collection operation. When the current time is in the active time-window, the garbage collection controller 134 may select, as the victim block, a memory block in which the number of valid pages is equal to or less than a first threshold value. Furthermore, when the current time is in the inactive time-window, the garbage collection controller 134 may select, as the victim block, a memory block in which the number of valid pages is equal to or less than a second threshold value which is larger than the first threshold value. That is, the garbage collection controller 134 may select more memory blocks as victim blocks in the inactive time-window and control the garbage collector 136 to perform the garbage collection operation, thereby promoting the garbage collection operation.

Figure 8:
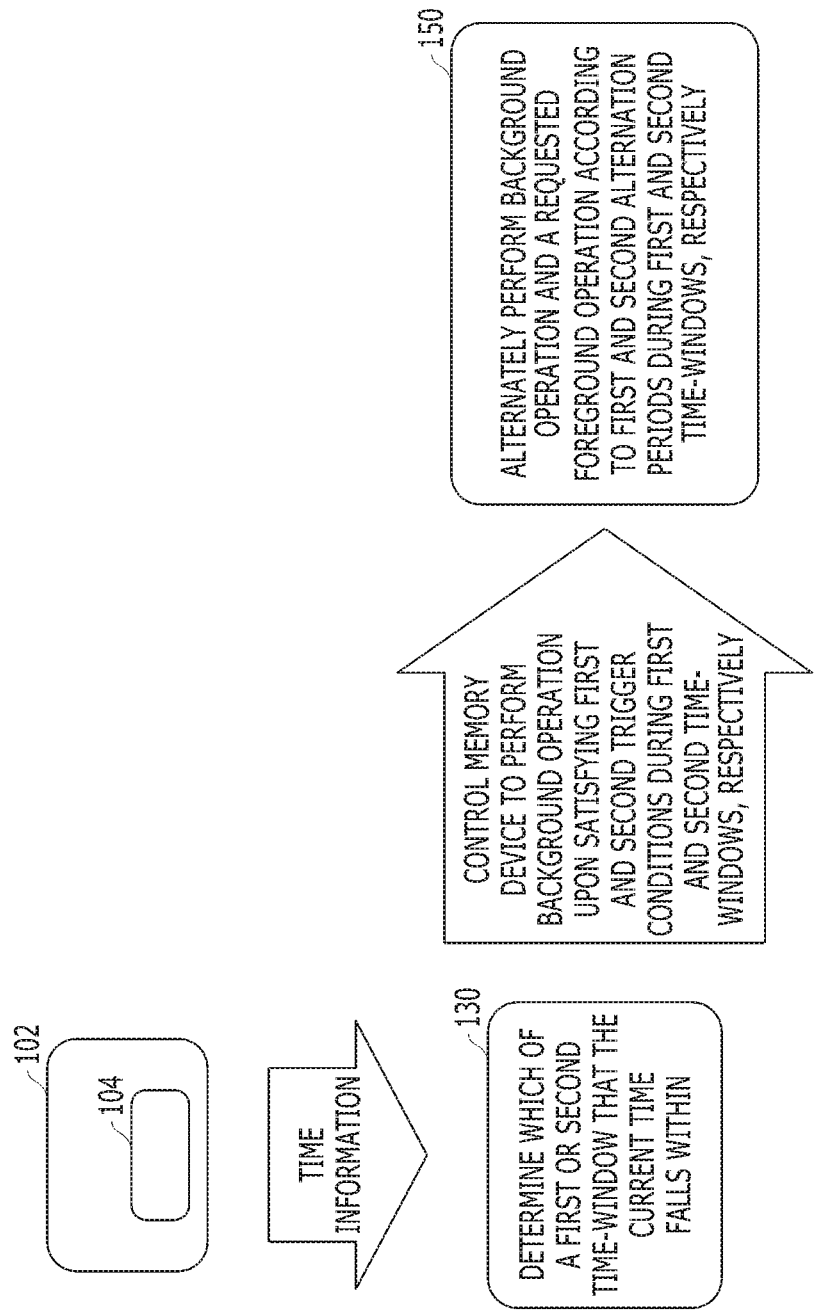
FIG. 8 is a block and flow diagram illustrating the data processing system 100 in accordance with an embodiment of the present invention.

FIG. 8 is a block and flow diagram illustrating the data processing system 100 in accordance with an embodiment of the present invention.

Referring to FIG. 8, the data processing system 100 may include the host 102 and the memory system 110. The memory system 110 may include the memory device 150 described with reference to FIG. 1 and the controller 130 for controlling the memory device 150.

The host 102 may be the same as that described with reference to FIG. 3. The host 102 may recognize current time through the real-time clock (RTC) 104. The host 102 may provide the current time (time information) to the controller 130.

The controller 130 may determine that the current time provided by the host 102 falls within either a first time-window or a second time-window, which together constitute a full day, i.e., 24 hour period. The two time-windows may, but need not be, equal in duration.

In an embodiment, the first time-window may be an active time window that represents the part of the day in which the associated device is used more, and the second time-window may be an inactive time-window that represents the remaining part of the day in which the associated device is used less. In an embodiment, the first time-window is a half of a day that includes all or most of the daytime and the second time-window is the other half of a day, i.e., all or most of the nighttime. In an embodiment, the first time-window is from 09:00 to 21:00 or from 06:00 to 18:00. However, the first and second time-windows are not necessarily tied to daytime and nighttime periods respectively. Rather, these windows may be set to coincide with actual use of a particular device. So, for example, if a particular device is used more at night than in the day, the first time-window may be set for the nighttime (or portion thereof) and the second time-window may be set for the daytime (or portion thereof).

Separate trigger conditions may be established for triggering performing a background operation, e.g., a garbage collection operation (GC), in the first and second time-windows respectively. The trigger conditions may be set to enable more aggressive GC during the second, i.e., inactive, time-window and to limit GC during the first, e.g., active, time-window during which write and read operations are prioritized. Thus, the controller 130 may control the memory device 150 to perform a background operation upon satisfying the first and second trigger conditions during the first and second time-windows, respectively.

In an embodiment, the controller 130 may control the memory device 150 to perform a background operation when the available memory space in the memory device 150 is less than first and second thresholds during the first and second time-windows, respectively. That is, the first trigger condition is that the available memory space in the memory device 150 is less than the first threshold during the first time-window, and the second trigger condition is that the available memory space in the memory device 150 is less than the second threshold during the second time-window. In an embodiment, the first threshold is less than the second threshold.

The controller 130 may control the memory device 150 to alternately perform the background operation and a requested foreground operation during the first time-window as illustrated in FIG. 7A, and to alternately perform the background operation and a requested foreground operation during the second time-window as illustrated in FIG. 7B.

In an embodiment, a first alternation period may be a single period in which the background operation (e.g., the garbage collection operation) and the requested foreground operation are performed once in the first mode, as illustrated in FIG. 7A. In an embodiment, the second alternation period may be a single period in which the background operation (e.g., the garbage collection operation) and the requested foreground operation are performed once in the second mode, as illustrated in FIG. 7B.

In an embodiment, the controller 130 may control the memory device to alternately perform the background operation for a longer time in the second alternation period than in the first alternation period, as illustrated in FIGS. 7A and 7B. In an embodiment, the second alternation period is longer than the first alternation period, as illustrated in FIGS. 7A and 7B.

FIGS. 9 to 17 are diagrams schematically illustrating application examples of the data processing system of FIGS. 1 to 8 according to various embodiments.

Figure 9:
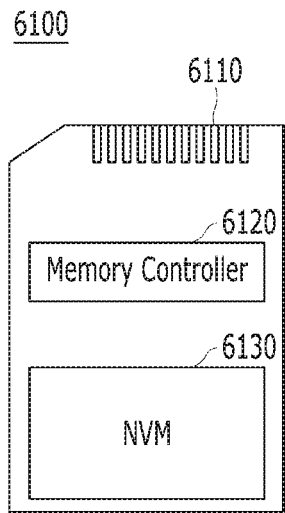
FIGS. 9 to 17 are diagrams schematically illustrating application examples of the data processing system, in accordance with various embodiments of the present invention.

FIG. 9 is a diagram schematically illustrating the data processing system including the memory system in accordance with an embodiment. FIG. 9 schematically illustrates a memory card system 6100 to which the memory system t is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 3, and the memory device 6130 may correspond to the memory device 150 of the memory system 110 described with reference to FIG. 3.

Thus, the memory controller 6120 may include a random access memory (RAM), a processor, a host interface, a memory interface and an error correction component.

The memory controller 6120 may communicate with an external device, for example, the host 102 of FIG. 3, through the connector 6110. For example, as described with reference to FIG. 3, the memory controller 6120 may be configured to communicate with an external device through one or more of various communication protocols, such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and/or Bluetooth. Thus, the memory system and the data processing system may be applied to wired and/or wireless electronic devices or particularly mobile electronic devices.

The memory device 6130 may be implemented by a nonvolatile memory. For example, the memory device 6130 may be implemented by any of various nonvolatile memory devices, such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) or a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). In another embodiment, the memory controller 6120 and the memory device 6130 may form a memory card, such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., miniSD card, microSD card and SDHC card) or a universal flash storage (UFS).

Figure 10:
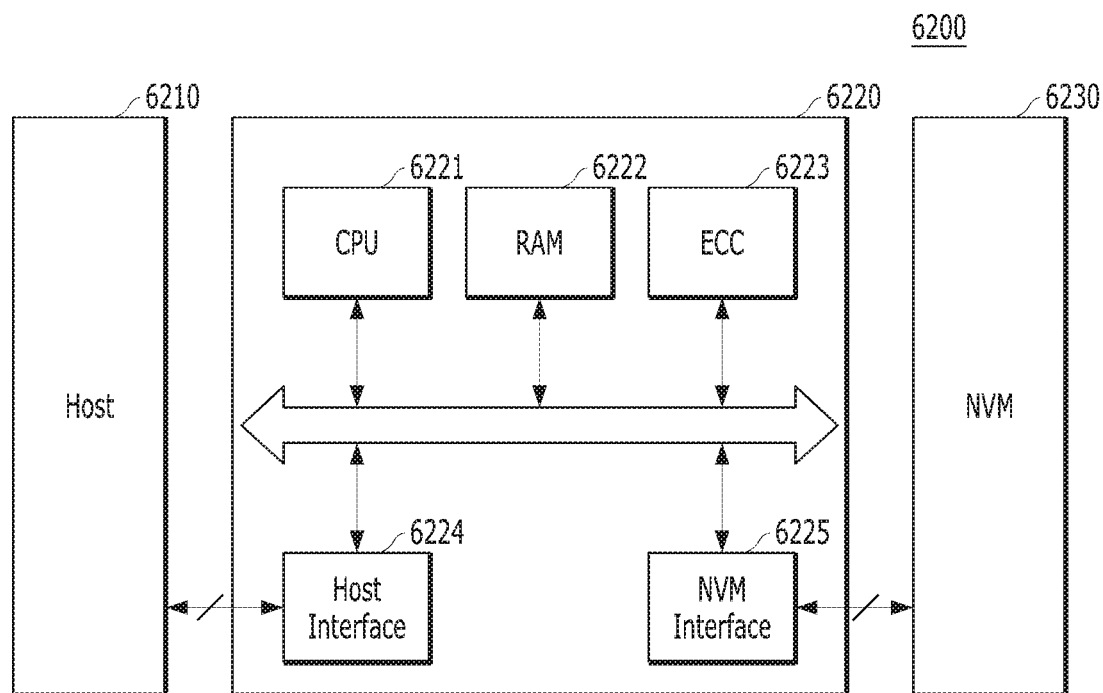

FIG. 10 is a diagram schematically illustrating another example of a data processing system 6200 including the memory system in accordance with an embodiment.

Referring to FIG. 10, the data processing system 6200 may include a memory device 6230 having one or more nonvolatile memories (NVMs) and a memory controller 6220 for controlling the memory device 6230. The data processing system 6200 may serve as a storage medium such as a memory card (CF card, SD card or the like) or USB device, as described with reference to FIG. 3. The memory device 6230 may correspond to the memory device 150 in the memory system 110 illustrated in FIG. 3, and the memory controller 6220 may correspond to the controller 130 in the memory system 110 illustrated in FIG. 3.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. The RAM 6222 may be used as a buffer memory for buffering data transmitted to the memory device 6230 from the host 6210 or transmitted to the host 6210 from the memory device 6230. The RAM 6222 may also be used as a cache memory to assist the memory device 6230 to operate at high speed.

The ECC circuit 6223 may correspond to the ECC component 138 of the controller 130 illustrated in FIG. 3. As described with reference to FIG. 3, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 3, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may exchange data with the host 6210 through the host interface 6224, and exchange data with the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then exchange data with the external device. In particular, as the memory controller 6220 is configured to communicate with the external device through one or more of various communication protocols, the memory system and the data processing system in accordance with an embodiment may be applied to wired and/or wireless electronic devices or particularly a mobile electronic device.

Figure 11:
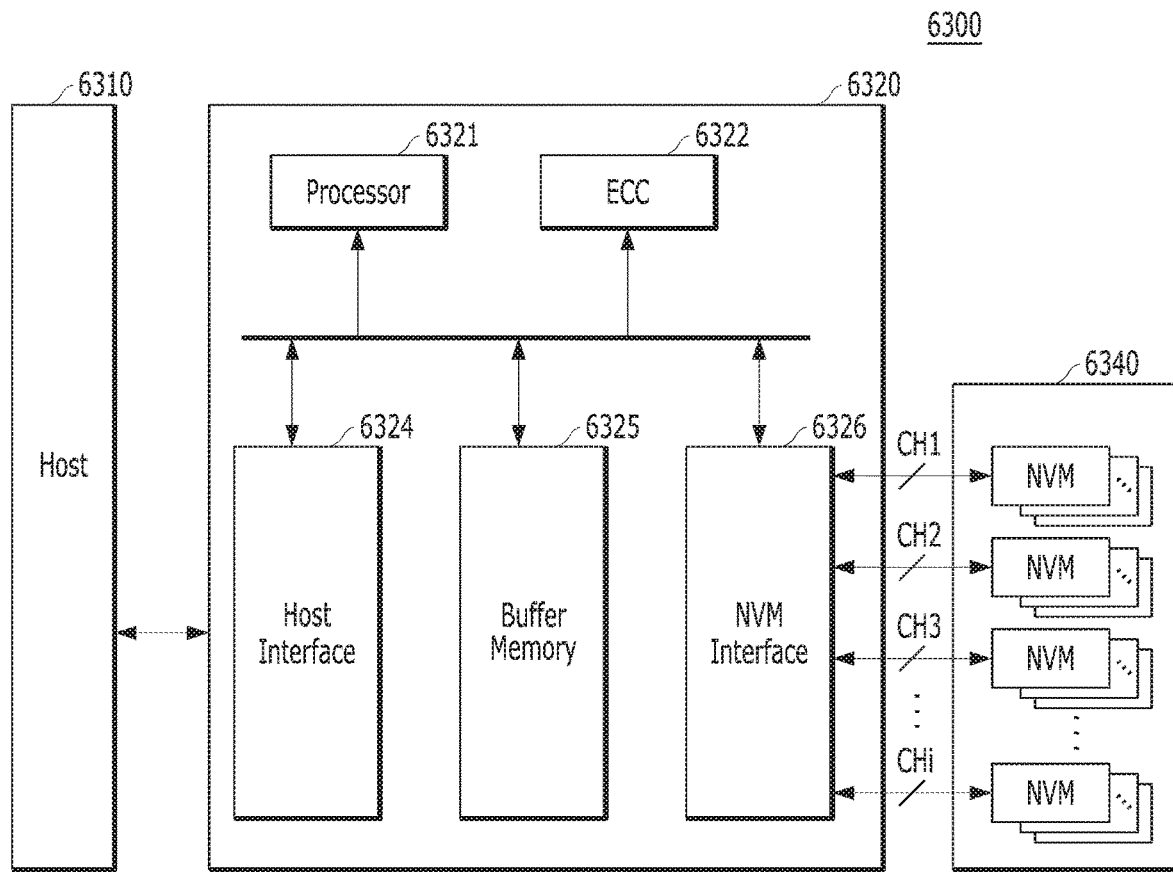

FIG. 11 is a diagram schematically illustrating another example of the data processing system including the memory system in accordance with an embodiment. FIG. 11 schematically illustrates a solid state drive (SSD) 6300 to which the memory system may be applied.

Referring to FIG. 11, the SSD 6300 may include a controller 6320 and a memory device 6340 including a plurality of nonvolatile memories (NVMs). The controller 6320 may correspond to the controller 130 in the memory system 110 of FIG. 3, and the memory device 6340 may correspond to the memory device 150 in the memory system of FIG. 3.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by a volatile memory such as dynamic random access memory (DRAM), synchronous DRAM (SDRAM), double data rate (DDR) SDRAM, low power DDR (LPDDR) SDRAM or graphics RAM (GRAM), or by a nonvolatile memory such as ferroelectric RAM (FRAM), resistive RAM (RRAM or ReRAM), spin-transfer torque magnetic RAM (STT-MRAM) or phase-change RAM (PRAM). By way of example, FIG. 10 illustrates that the buffer memory 6325 is disposed in the controller 6320. However, the buffer memory 6325 may be disposed externally to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 3 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
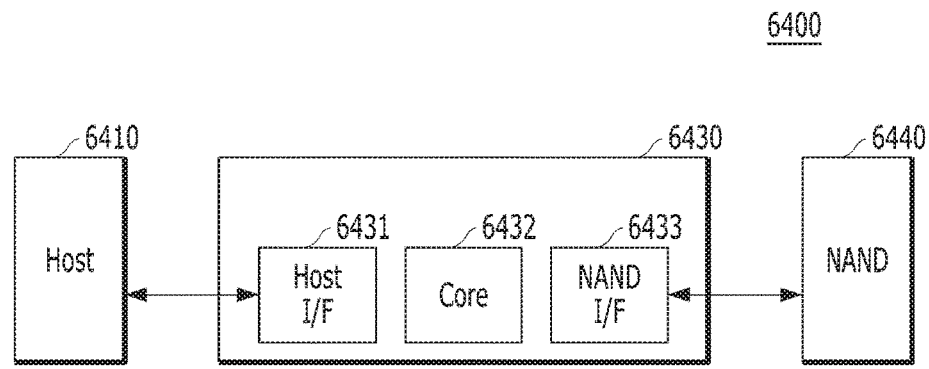

FIG. 12 is a diagram schematically illustrating another example of the data processing system including the memory system in accordance with an embodiment. FIG. 12 schematically illustrates an embedded Multi-Media Card (eMMC) 6400 to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIG. 3, and the memory device 6440 may correspond to the memory device 150 in the memory system 110 of FIG. 3.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 3. Furthermore, the host interface 6431 may serve as a serial interface, for example, Ultra High Speed (UHS)-I and UHS-II interface.

The memory controller 6120, the memory controller 6220, the controller 6320 and the controller 6430, which have been described with reference to FIGS. 8 to 11, may determine the garbage collection trigger condition based on the current time, and perform the garbage collection operation according to whether the garbage collection trigger condition is satisfied, thereby improving the performances of the memory card system 6100, the data processing system 6200, the SSD 6300 and the eMMC 6400, which users feel.

FIGS. 13 to 16 are diagrams schematically illustrating other examples of the data processing system including the memory system in accordance with one or more embodiments. FIGS. 13 to 16 schematically illustrate universal flash storage (UFS) systems to which the memory system may be applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices or particularly mobile electronic devices through UFS protocols. The UFS devices 6520, 6620, 6720 and 6820 and the UFS cards 6530, 6630, 6730 and 6830 may be embodied by the memory system 110 illustrated in FIG. 3. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 9 to 11, and the UFS cards 6530, 6630, 6730 and 6830 may be embodied in the form of the memory card system 6100 described with reference to FIG. 8.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 13:
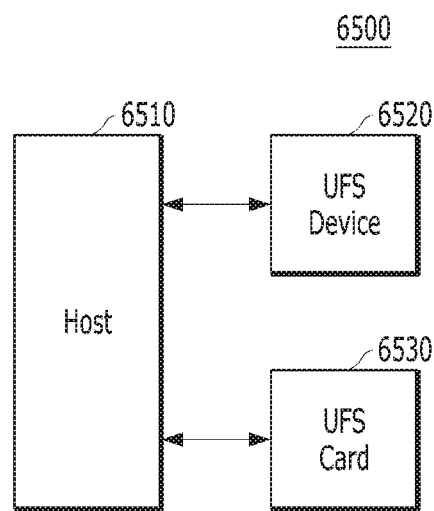

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In accordance with an embodiment, the configuration in which one UFS device 6520 and one UFS card 6530 are connected to the host 6510 is illustrated. However, in another embodiment, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 14:
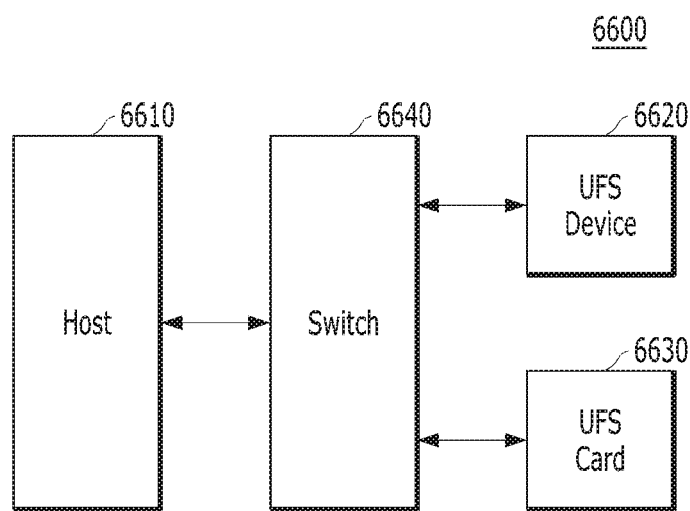

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In accordance with an embodiment, the configuration in which one UFS device 6620 and one UFS card 6630 are connected to the switching module 6640 is illustrated. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 15:
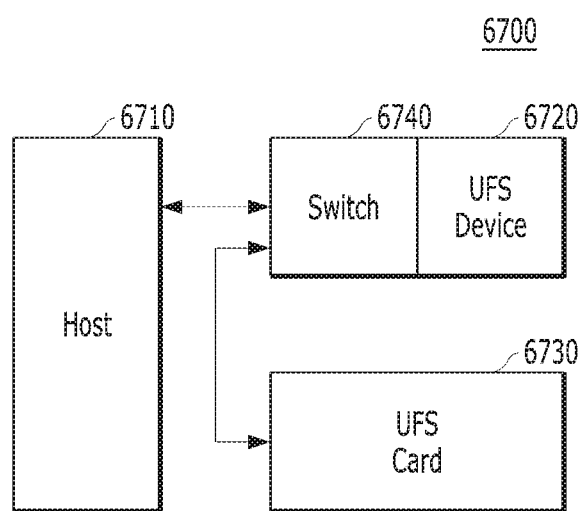

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In accordance with an embodiment, the configuration in which one UFS device 6720 and one UFS card 6730 are connected to the switching module 6740 is illustrated. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
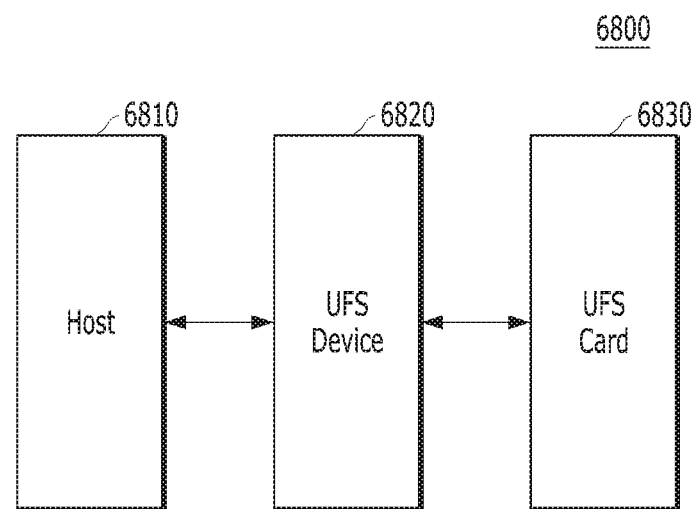

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In accordance with an embodiment, the configuration in which one UFS device 6820 is connected to the host 6810 and one UFS card 6830 is connected to the UFS device 6820 is illustrated. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
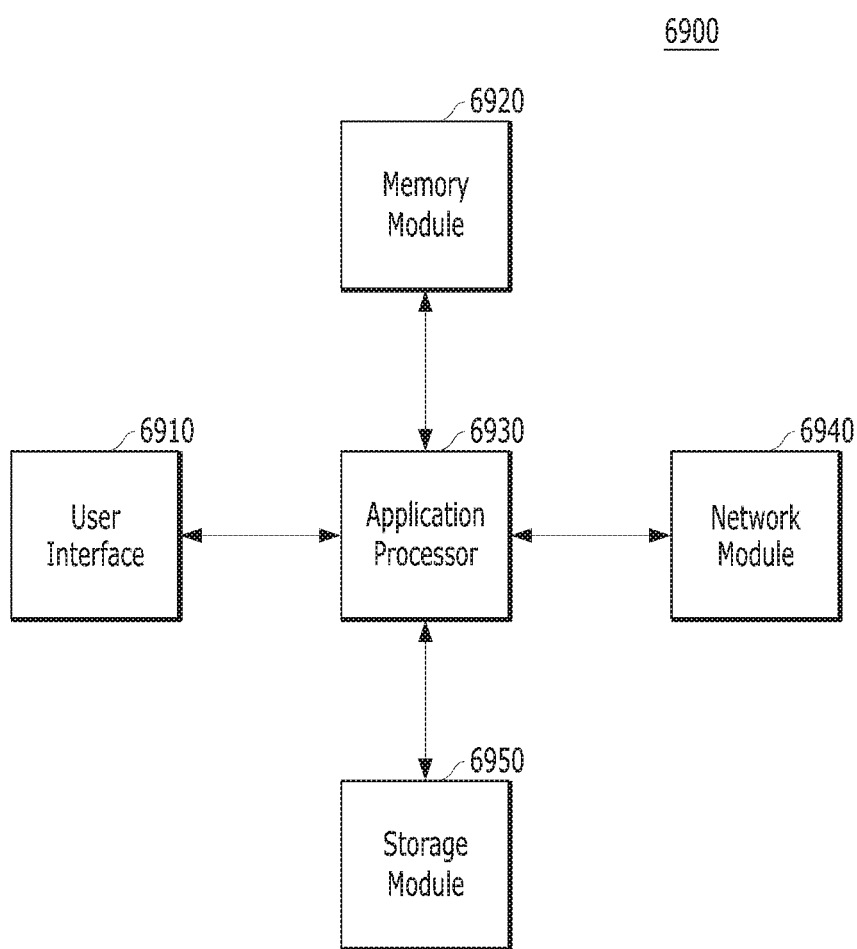

FIG. 17 is a diagram schematically illustrating another example of the data processing system including the memory system in accordance with an embodiment. FIG. 17 is a diagram schematically illustrating a user system 6900 to which the memory system may be applied.

Referring to FIG. 17, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 3. Furthermore, the storage module 6950 may be embodied as an SSD, eMMC and UFS as described above with reference to FIGS. 10 to 15.

In an embodiment, the storage module 6950 may determine the garbage collection trigger condition based on the current time, and perform the garbage collection operation according to whether the garbage collection trigger condition is satisfied, thereby improving the performance of the storage module 6950, which users feel.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 3 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the application processor 6930 on a display/touch module of the mobile electronic device, or support a function of receiving data from the touch panel.

In accordance with embodiments, a memory device capable of improving the performance of a foreground operation, and an operation method thereof are provided.

Although various embodiments have been illustrated and described, it will be apparent to those skilled in the art in light of the present disclosure that various changes and modifications may be made without departing from the spirit and scope of the invention as defined in the following claims.

What is claimed is:

1. An operation method of a memory system, the operation method comprising:
    determining a garbage collection trigger condition based on current time and usage of the memory system over a set period of time; and
    performing a garbage collection operation when the garbage collection trigger condition is satisfied,
    wherein the garbage collection trigger condition corresponds to a first condition when the current time is in an active time-window and the garbage collection trigger condition corresponds to a second condition different from the first condition when the current time in an inactive time-window, and
    wherein the determining of the garbage collection trigger condition comprises:
    determining a size of memory free space as being equal to or less than a first threshold value as the first condition, when the current time is in the active time-window; and
    determining the size of the memory free space as being equal to or less than a second threshold value, which is larger than the first threshold value, as the second condition, when the current time is in the inactive time-window.

2. The operation method of claim 1, further comprising determining the size of the memory free space based on the number of free blocks.

3. The operation method of claim 1, further comprising determining a duration time of the garbage collection operation based on whether the current time is in the active time-window or in the inactive time-window.

4. The operation method of claim 3, wherein the duration time of the garbage collection operation is determined to be longer when the current time is in the inactive time-window than when the current time is in the active time-window.

5. The operation method of claim 3, further comprising selecting, as a victim block, a memory block having a lesser number of valid pages than a third threshold value when the current time is in the active time-window, and a memory block having a lesser number of valid pages than a fourth threshold value, which is greater than the third threshold value, when the current time is in the inactive time-window.

6. The operation method of claim 1,
    wherein the active time-window is daytime, and
    wherein the inactive time-window is nighttime.

7. The operation method of claim 1, further comprising determining the current time based on time information received from a host.

8. A memory system comprising:

a memory device configured to store data; and a controller configured to control the memory device, wherein the controller comprises:

a garbage collection controller configured to determine a garbage collection trigger condition based on current time and usage of the memory system over a set period of time; and a garbage collector configured to perform a garbage collection operation when the garbage collection trigger condition is satisfied, wherein the garbage collection trigger condition corresponds to a first condition when the current time is in an active time-window and the garbage collection trigger condition corresponds to a second condition different from the first condition when the current time in an inactive time-window, and wherein the garbage collection controller determines a size of a memory free space as being equal to or less than a first threshold value as the first condition when the current time is in the active time-window, and determines the size of the memory free space as being equal to or less than a second threshold value, which is larger than the first threshold value, as the second condition when the current time is in the inactive time-window.

9. The memory system of claim 8, wherein the garbage collection controller determines the size of the memory free space based on the number of free blocks.

10. The memory system of claim 8, wherein the garbage collection controller determines a duration time of the garbage collection operation based on whether the current time is in the active time-window or in the inactive time-window.

11. The memory system of claim 10, wherein the garbage collection controller determines duration time of the garbage collection operation to be longer when the current time is in the inactive time-window than when the current time is in the active time-window.

12. The memory system of claim 10, wherein the garbage collection controller selects, as a victim block, a memory block having a lesser number of valid pages than a third threshold value when the current time is in the active time-window, and a memory block having a lesser number of valid pages than a fourth threshold value, which is greater than the third threshold value when the current time is in the inactive time-window.

13. The memory system of claim 8, wherein the active time-window is daytime, and wherein the inactive time-window is nighttime.

14. The memory system of claim 8, wherein the garbage collection controller determines the current time based on time information received from a host.

* * * * *